United States Patent
Hopper et al.

(10) Patent No.: US 8,991,704 B2
(45) Date of Patent: Mar. 31, 2015

(54) SNAP-ON MODULE FOR SELECTIVELY INSTALLING RECEIVING ELEMENT(S) TO A MOBILE DEVICE

(71) Applicant: Intermec IP Corp, Everett, WA (US)

(72) Inventors: Scott R Hopper, Snohomish, WA (US); Sander Lam, Everett, WA (US)

(73) Assignee: Intermec IP Corp., Everett, WA (US)

( * ) Notice: Subject to any disclaimer, the term of this patent is extended or adjusted under 35 U.S.C. 154(b) by 0 days.

(21) Appl. No.: 13/713,676

(22) Filed: Dec. 13, 2012

(65) Prior Publication Data

US 2013/0153658 A1    Jun. 20, 2013

Related U.S. Application Data

(60) Provisional application No. 61/570,617, filed on Dec. 14, 2011.

(51) Int. Cl.
*G06K 7/00* (2006.01)
*G06K 7/10* (2006.01)
*G06K 7/14* (2006.01)
*G06F 1/16* (2006.01)
*H01P 11/00* (2006.01)

(52) U.S. Cl.
CPC ............ *G06F 1/1684* (2013.01); *G06K 7/0004* (2013.01); *G06K 7/10316* (2013.01); *H01P 11/00* (2013.01); *G06K 7/10386* (2013.01)
USPC ........... 235/440; 235/435; 235/439; 235/454; 235/462.45; 235/462.46; 235/472.01; 235/492

(58) Field of Classification Search
CPC .............. G06K 7/00; G06K 7/10; G06K 7/14
USPC .................... 235/435, 439, 440, 454, 462.45, 235/472.01, 492; 456/349, 557; 455/349, 455/557

See application file for complete search history.

(56) References Cited

U.S. PATENT DOCUMENTS

| | | | | |
|---|---|---|---|---|
| 4,884,266 A | * | 11/1989 | Pflaumer | 370/545 |
| 5,349,497 A | * | 9/1994 | Hanson et al. | 361/679.58 |
| 5,410,141 A | * | 4/1995 | Koenck et al. | 235/472.02 |
| 5,736,726 A | * | 4/1998 | VanHorn et al. | 235/472.02 |
| 6,191,743 B1 | * | 2/2001 | Jones et al. | 343/702 |
| 6,708,887 B1 | * | 3/2004 | Garrett et al. | 235/462.45 |
| 7,577,462 B2 | * | 8/2009 | Kumar | 455/557 |
| RE44,122 E | * | 4/2013 | Kumar | 455/557 |
| 2002/0065902 A1 | * | 5/2002 | Janik et al. | 709/219 |

(Continued)

*Primary Examiner* — Thien M Le
*Assistant Examiner* — Claude J Brown
(74) *Attorney, Agent, or Firm* — Additon, Higgins & Pendleton, P.A.

(57) ABSTRACT

An apparatus and method for selectively attaching sensor(s) or antenna(s) to a mobile device at a convenient location are provided. The mobile device includes a body and a processing unit housed within the body for running an application, where the body includes a forward end and a rearward end that supports engagement with a charging dock. In addition, the rearward end accepts engagement of a snap-on module that physically assembles to and electronically interfaces with the mobile device. The antennas or sensors are externally mounted to the mobile device at a location proximate to the forward end of the body. Further, these antennas or sensors are interconnected to the snap-on module using media-routing conduit(s) that are configured to carry signals from the antennas or sensors to the snap-on module for distribution as an input to the application running on the processing unit.

18 Claims, 4 Drawing Sheets

(56) References Cited

U.S. PATENT DOCUMENTS

| | | | |
|---|---|---|---|
| 2002/0099894 A1* | 7/2002 | Kehoe et al. | 710/300 |
| 2004/0137983 A1* | 7/2004 | Kerr et al. | 463/29 |
| 2004/0198241 A1* | 10/2004 | Crawford et al. | 455/90.1 |
| 2005/0210173 A1* | 9/2005 | Kehoe et al. | 710/260 |
| 2006/0180726 A1* | 8/2006 | Mollinari | 248/316.1 |
| 2007/0146985 A1* | 6/2007 | Mick et al. | 361/683 |
| 2009/0066509 A1* | 3/2009 | Jernstrom et al. | 340/568.1 |
| 2009/0224039 A1* | 9/2009 | Hause et al. | 235/385 |
| 2009/0267845 A1* | 10/2009 | Murata et al. | 343/702 |
| 2009/0289116 A1* | 11/2009 | Copeland et al. | 235/440 |
| 2009/0312053 A1* | 12/2009 | An | 455/556.2 |
| 2009/0321524 A1* | 12/2009 | Bellows et al. | 235/462.45 |
| 2010/0018006 A1* | 1/2010 | Mangaroo et al. | 16/422 |
| 2010/0208424 A1* | 8/2010 | Swan et al. | 361/679.56 |
| 2011/0121075 A1* | 5/2011 | Bellows et al. | 235/440 |
| 2012/0071214 A1* | 3/2012 | Ash et al. | 455/571 |

* cited by examiner

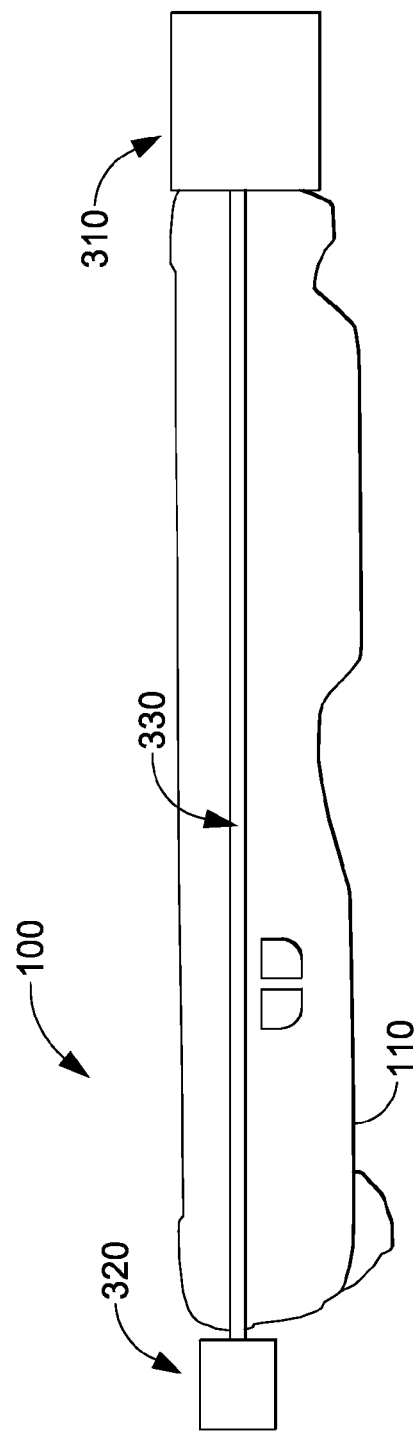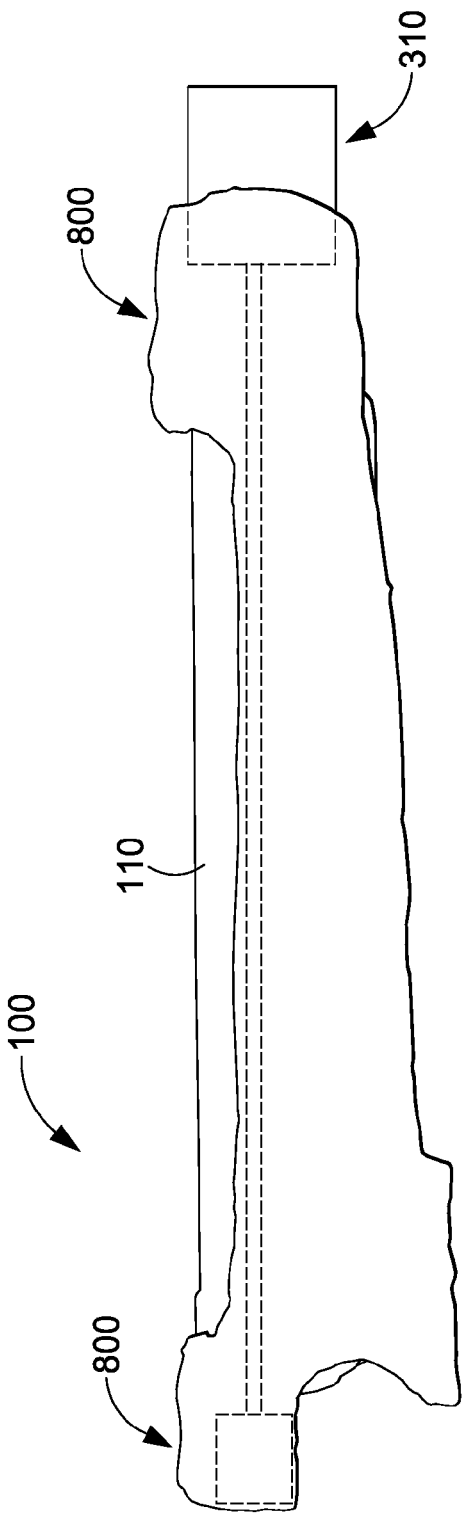

SNAP-ON MODULE FOR SELECTIVELY INSTALLING RECEIVING ELEMENT(S) TO A MOBILE DEVICE

CROSS-REFERENCE TO RELATED APPLICATIONS

This application claims the benefit of U.S. Provisional Application No. 61/570,617, filed Dec. 14, 2011, now pending, entitled "SNAP-ON MODULE FOR SELECTIVELY INSTALLING RECEIVING ELEMENT(S) TO A MOBILE DEVICE," which is herein incorporated by reference.

STATEMENT REGARDING FEDERALLY SPONSORED RESEARCH OR DEVELOPMENT

Not applicable.

BACKGROUND OF THE INVENTION

This invention relates to a snap-on module that allows for adding a sensor (e.g., radio frequency identification (RFID) reader) or an antenna (e.g., directional antenna) to a mobile device, such as a handheld computer. More particularly, embodiments of the present invention pertain to a method and apparatus for combining the snap-on module to a rearward end of the mobile device while conveniently locating the sensor or antenna at a forward end of the mobile device.

Currently, there are two prevalent approaches for incorporating tag-reading technology within a handheld computer: offering a (RFID) reader that assembles to the rearward end of the handheld computer; or integrating the RFID reader into the handheld computer. The externally assembled RFID reader typically includes a large and bulky plastic case to contain the necessary equipment for the purposes of tag-reading. Further, the location of the externally assembled RFID reader is less than ideal, as the equipment (e.g., antenna or sensor) within the plastic case is positioned at the rearward end of the handheld computer. This inconvenient positioning causes an operator to renegotiate the orientation of the handheld computer each time the directional antenna communication or tag-reading functionality is to be employed.

The integrated RFID reader, located internally to the handheld computer, includes various other drawbacks. For instance, packing the necessary equipment (to carry a tag-reading or directional communication) internally within a case of the handheld computer reduces the number of configurations to which the handheld computer may be adapted. As such, in light of the shortcomings associated with the conventional practices of providing an RFID reader to a handheld computer, the applicants have identified a need to selectively install a snap-on module to the handheld computer while locating a sensor or antenna at a forward end of the handheld computer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

Embodiments of the invention provide an apparatus and a method for selectively installing a snap-on module to a rearward end of a handheld computer such that antenna(s) or sensor(s), which are connected to the snap-on module, are optimally located at a forward end of the handheld computer. As such, the present invention addresses the issue of present external RFID readers that inconveniently locate sensors or antennas at the rearward end of a handheld device due to the position of a communications end.

Generally, the handheld device is configured with a forward end and a rearward end, or "communications end." The communications end is typically pointed toward an operator of the handheld device during normal use. Further, the communications end is outfitted to engage with a charger that, when fastened to the communications end, acts to distribute power to a battery internal to the handheld computer. The snap-on module is configured to both electronically and physically engage to the handheld computer at the communications end. Further, the snap-on module may be adapted to support pass-through charging when docked with the charger, thereby allowing the snap-on module to be engaged while distributing power to a battery of the handheld computer.

The sensor(s) or antenna(s) may be connected to the snap-on module via media-routing conduits. In an exemplary embodiment, the sensor(s) or antenna(s) are positioned at a forward end of the handheld computer and the media-routing conduits interconnect the sensor(s) or antenna(s) to the snap-on module. These media-routing conduits may be positioned externally alongside a body or casing of the handheld computer as more fully discussed below with reference to the figures. Further, the media-routing conduits may be configured as communication pathways (e.g., coaxial cable, optical cable, balanced twisted wire, pressure-sensing tube) that allow signals to be exchanged between the sensor(s) or antenna(s) and the snap-on module.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 7 is an elevation view of the first mobile device of FIG. 1 with the apparatus installed thereto, in accordance with an embodiment of the present invention; and FIG. 8 is an elevation view similar to FIG. 7, but with a boot covering portions of the installed apparatus, in accordance with an embodiment of the present invention.

DETAILED DESCRIPTION

Embodiments provide methods and an apparatus for selectively attaching a snap-on module, which is connected to sensor(s) or antenna(s) located at a forward end of a mobile device, to a rearward end of the mobile device. The rearward end, or "communications end," of the handheld device is configured to physically engage with the snap-on module and to electronically interface with equipment and/or media coupled to the snap-on module. Thus, embodiments of the present invention solve the problematic design issues facing conventional RFID readers, as discussed above. Further, the positioning of the snap-on module and the sensor(s) or antenna(s) at opposite ends of the mobile device, respectively, gain the following advantages: retrofitting to a wide range of handheld computers (e.g., RFID readers); providing aftermarket adaptability to legacy mobile devices; enabling direct communication for mobile devices, thereby limiting the requirement of including Wi-Fi and BT radios; supporting plug-and-play antenna(s) or sensor(s) that provide inputs to various applications; offering a lightweight solution to incorporating antenna or sensor functionality; and abstaining from interfering with other selectively assembled components (e.g., scan handles).

It should be appreciated and understood that embodiments of the present invention may include, among other things, a computer-program product incorporated within the snap-on module that operates to facilitate an electronic interaction between applications on the mobile device and accessories (e.g., sensors or antennas) connected to the snap-on module. Accordingly, the embodiments may take the form of a hardware embodiment, a software embodiment, or an embodiment combining software and hardware. In one embodiment, the present invention takes the form of a computer-program product within the casing of the snap-on module that includes computer-useable instructions embodied on one or more computer-readable media.

Computer-readable media include both volatile and nonvolatile media, removable and nonremovable media, and contemplate media readable by a database, a switch, and various other network devices. By way of example, computer-readable media comprise media implemented in any method or technology for storing information. Examples of stored information include computer-useable instructions, data structures, program modules, and other data representations. Media examples include information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
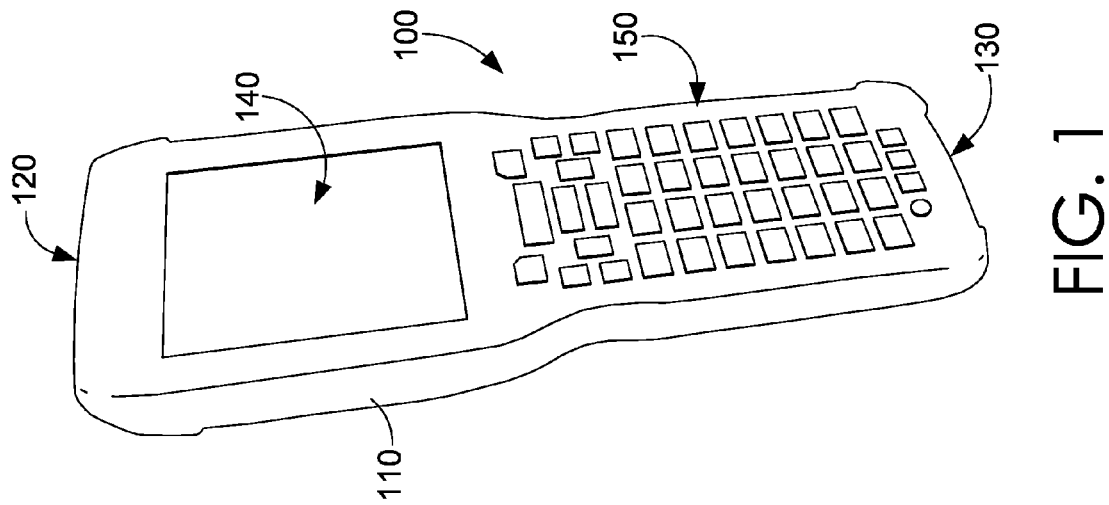
FIG. 1 provides an exemplary depiction of a first mobile device (e.g., model CK71 manufactured by Intermec®) for accepting a snap-on module, in accordance with an embodiment of the present invention.

Referring to the drawings in general, and initially to FIG. 1 in particular, an example of a first mobile device 100 that may receive a snap-on module 310 is shown. As illustrated in FIG. 1, the first mobile device is configured with a body 110, a presentation device 140, and an input device 150, such as a keypad. The body 110 may include a forward end 120 (typically facing away from an operator of the first mobile device 100 when in use) and a rearward end 130 (typically facing toward the operator of the first mobile device 100 when in use). In embodiments, the body 110 may comprise a protective casing (e.g., plastic, metal, or other resilient material) and ergonomic features (e.g., laterally aligned ribs and grooves) for enhanced grip by the operator's hand.

In embodiments, the presentation device 140 is configured to render and/or present a user-interface (UI) display thereon. The presentation device 140, which is operably coupled to an output of the first mobile device 100, may be configured as any presentation component that is capable of presenting information to a user, such as a digital monitor, electronic display panel, touch-screen, analog set top box, plasma screen, and the like. In one exemplary embodiment, the presentation device 140 is configured to present graphical content, such as a UI display that includes a display area populated graphical media. In another exemplary embodiment, the presentation device 140 is capable of rendering other forms of media (e.g., audio signals).

The input device 150 is provided to receive input(s) affecting, among other things, a presentation of the graphical media in a display area at the presentation device 140 and interacting with application(s) installed on a processing unit (not shown) of the first mobile device 100. Illustrative devices include a mouse, joystick, key pad, microphone, I/O components, or any other user-input mechanism capable of receiving a user input and communicating an indication of that input to the processing unit of the first mobile device 100. By way of example only, the input device 150 controls whether to receive an input from sensors (see receiving elements 320 of FIG. 3) that are connected to a snap-on module (e.g., reference numeral 310 of FIG. 3).

Figure 2:
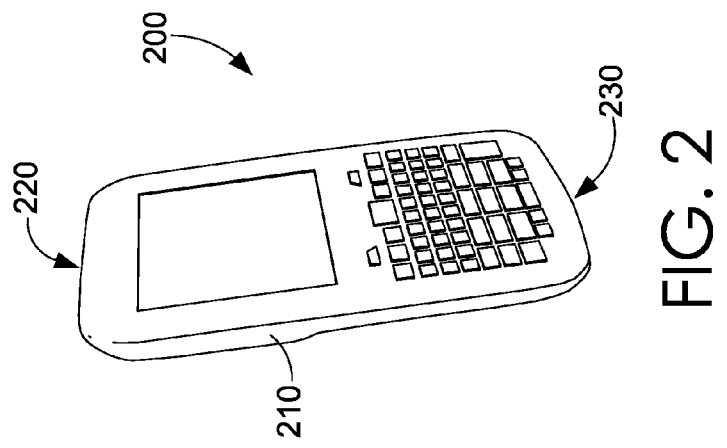
FIG. 2 provides an exemplary depiction of a second mobile device (e.g., model CN70e manufactured by Intermec®) for accepting the snap-on module, in accordance with an embodiment of the present invention.
Figure 3:
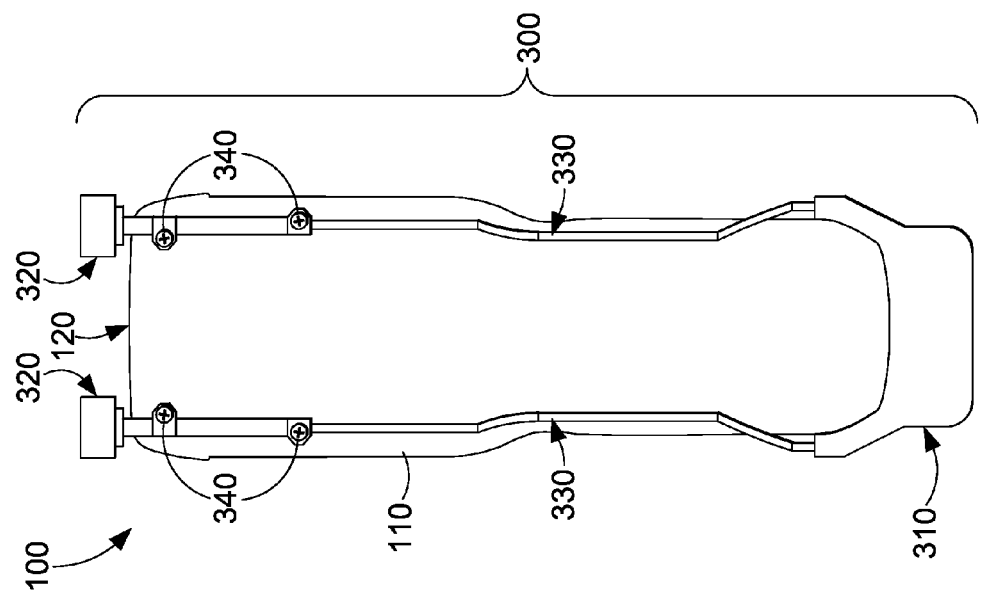
FIG. 3 is a schematic diagram showing the first mobile device of FIG. 1 outfitted with an apparatus comprising the snap-on module connected to receiving elements, in accordance with an embodiment of the present invention.

Turning now to FIG. 2, an exemplary depiction of a second mobile device 200 for accepting the snap-on module 310 of FIG. 3 is shown, in accordance with an embodiment of the present invention. Similar to the first mobile device 100, the second mobile device 200 includes a body 210 with a forward end 220 and a rearward end 230. In exemplary embodiments, the rearward ends 130 and 230 of the mobile devices 100 and 200, respectively, are configured to accept modules mounted thereto and shall be hereinafter referred to as "communication ends." For instance, the communication ends 130 and 230 are configured to dock with a charger that distributes power to battery(s) internal to the mobile devices 100 and 200. As such, the communication ends 130 and 230 may serve as electronic interfaces for operably coupling modules to the processing unit housed by the mobile devices 100 and 200.

Typically, each of the mobile devices 100 and 200 include, or is linked to, some form of a computing unit (e.g., central processing unit, microprocessor, etc.) to support operations of the application(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the mobile devices 100 and 200 to enable each device to perform communication-related processes, RFID-reading functionality, and other operations. In another instance, the computing unit may encompass a processing unit coupled to the computer-readable medium accommodated by each of the mobile devices 100 and 200. Generally, the computer-readable medium stores, at least temporarily, a plurality of computer software components that are executable by the processing unit. As utilized herein, the phrase "processing unit" is not meant to be limiting and may encompass any elements of the computing unit that act in a computational capacity. In such capacity, the processing unit may be configured as a tangible article that processes instructions. In an exemplary embodiment, processing may involve fetching, decoding/interpreting, executing, and writing back instructions.

It should be appreciated and understood that the mobile devices 100 and 200, shown in FIGS. 1 and 2, may take the form of various types of computing devices, such as, for example, a handheld computer. By way of example only and not limitation, the mobile devices 100 and 200 may be a handheld device, mobile handset, consumer electronic device, a rugged industrial device (e.g., bar-code scanner), cell phone, personal digital assistant (PDA) unit, and the like. Further, the mobile device may be enabled with functionality (e.g., UHF/RFID) to carry out one or more of the following tasks: monitoring field service; guiding transportation and logistics; directing store delivery; tracking manufacturing and warehousing; and recording parcel delivery (e.g., CEP and home delivery). It should be noted, however, that the invention is not limited to implementation on such computing devices, but may be implemented on any of a variety of different types of computing devices within the scope of embodiments of the present invention.

Figure 4:
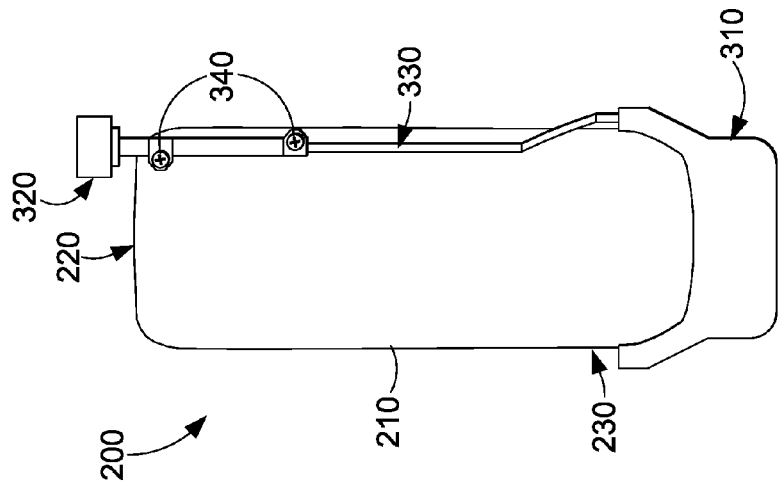
FIG. 4 is a schematic diagram showing the second mobile device of FIG. 2 outfitted with the apparatus, in accordance with an embodiment of the present invention.

Turning now to FIGS. 3 and 4, schematic diagrams showing the mobile devices 100 and 200 outfitted with an apparatus 300 comprising the snap-on module 310 connected to receiving elements 320 are shown, in accordance with embodiments of the present invention. Initially, the apparatus 300 includes the snap-on module 310, the receiving elements 320 (e.g., sensors or antenna), and media-routing conduits 330 that interconnect the receiving elements 320 with the snap-on module 310. As illustrated, the snap-on module 310 may temporarily fasten, selectively assemble, or "snap-on," to the communication ends 130 and 230 of the mobile devices 100 and 200, respectively.

As mentioned above, the communication ends 130 and 230 are substantially directed toward the operator of the mobile devices 100 and 200, respectively, during use. If particular equipment resides within a casing of the snap-on module 310, as in conventional devices, the operator would be obliged to renegotiate the orientation of the mobile devices 100 and 200 in order to properly align the equipment with an RFID tag, a broadcasting station, or other directional-specific items. Accordingly, in embodiments of the present invention, the receiving elements 320 are located at position proximate to the forward ends 120 and 220 of the mobile devices 100 and 200, respectively. In this way, the receiving elements 320 appear in an operator-preferred and convenient location for gathering data (sensors) or for receiving transmissions (antennas).

The number of receiving elements 320 may vary based on attributes of the mobile devices 100 and 200, inter alia. In embodiments, as illustrated in FIGS. 3 and 4, the number of receiving elements 320 may vary between one and two in accordance with the functionality or application of the mobile devices 100 or 200 being employed by the operator. For example, two receiving elements 320 may be installed when reading RFID tags, while a single receiving element 320 may be installed when sending or receiving wireless communications. Although two examples of configurations of the receiving element(s) 320 have been shown, it should be appreciated and understood that other configurations are contemplated by embodiments of the present invention.

Typically, media-routing conduits 330 are provided to interconnect the receiving elements 320 with the snap-on module 310, as illustrated in FIGS. 3 and 4. These media-routing conduits 330 may be positioned externally alongside the body 110 and 210 of the mobile devices 100 and 200, respectively. As illustrated, the media-routing conduits 330 may be securely inserted or coupled to the snap-on module 310 at one end and fixedly coupled to the mobile devices 100 and 200 via attachment points 340 (e.g., hardware fasteners). Further, the media-routing conduits 330 may be configured as communication pathways (e.g., coaxial cable, optical cable, balanced twisted wire, pressure-sensing tube) that allow signals to be exchanged between the receiving elements 320 and the snap-on module 310.

Although the receiving elements 320 are described with particularity as either sensors or antennas, it should be appreciated and understood that other types of mechanisms may be employed as one or more of the receiving elements 320. By way of example, other forward-facing sensors, beyond an RFID-tag reader, may be used as at least one of the receiving elements 320. Further, the receiving elements 320 may be individual elements that do not necessarily carry out the same operation. For instance, one of the receiving elements 320 may be configured as a sensor, while another of the receiving elements on the same mobile device may be configured as an antenna.

Figure 5:
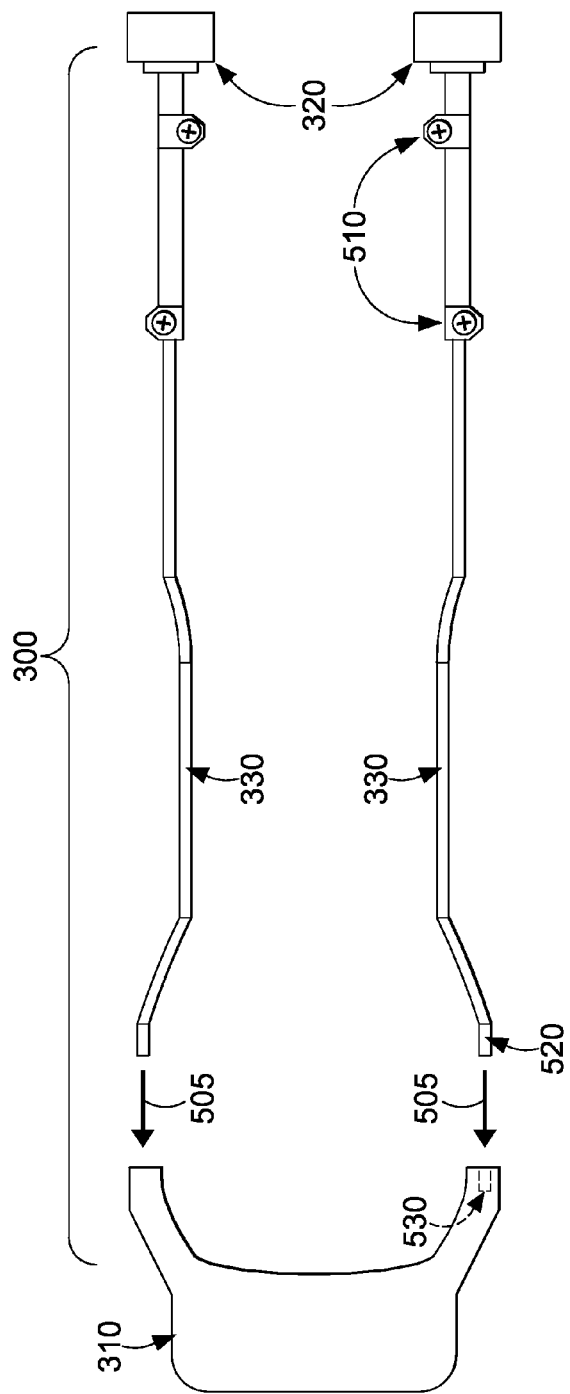
FIG. 5 is a schematic diagram showing the exemplary apparatus with its components disassembled, in accordance with an embodiment of the present invention.
Figure 6:
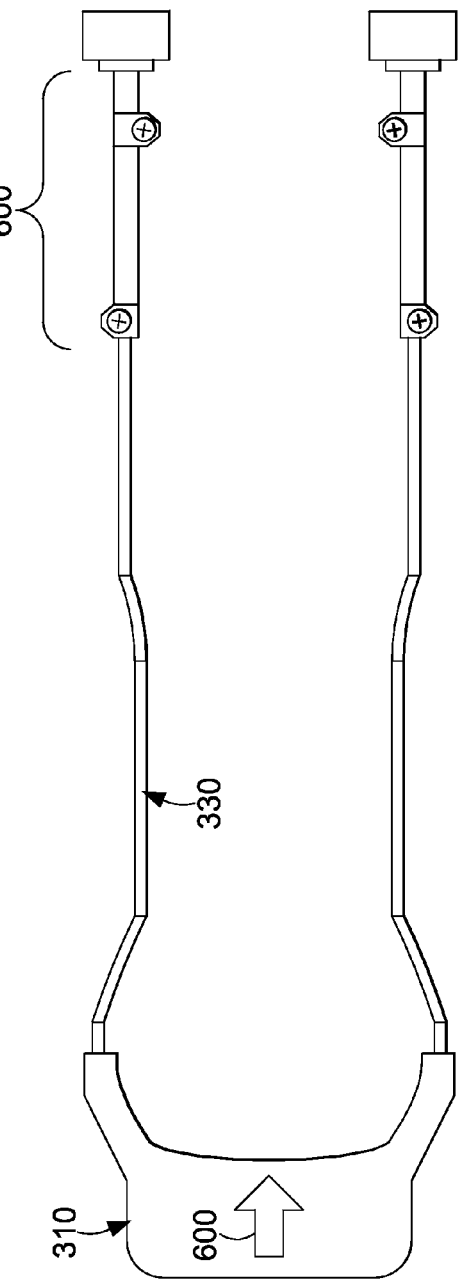
FIG. 6 is a schematic diagram similar to FIG. 5, but the components of the apparatus assembled, in accordance with an embodiment of the present invention.

With reference to FIGS. 5 and 6, schematic diagrams showing the exemplary apparatus 300 with its components disassembled and assembled are shown, respectively, in accordance with embodiments of the present invention. When disassembled from the snap-on module 310, ends 520 of the media-routing conduits 330 (e.g., coaxial cables) are disengaged from connectors 530 that are built into the snap-on module 310 and configured to frictionally engage with the ends 520. For example, the connectors 530 may be an MMCX 6 GHz connector that physically couples with and electronically interfaces to the ends 520 of the media routing conduits 330. During assembly, the ends 520 may be inserted into the connectors 530, respectively, as depicted by reference arrows 505.

With reference to FIG. 5, an exemplary embodiment of the apparatus 300 is shown that includes fasteners 510 employed at the attachment locations (see reference numeral 340 of FIG. 3). These fasteners 510 assist in holding the receiving elements 320, in conjunction with forward ends of the media-routing conduits 330, against the body of the mobile device. In embodiments, a plurality of fasteners are employed for fixedly securing the receiving elements 320, especially when the receiving elements comprise robust configurations (e.g., rugged antenna assemblies for carrying out linear or circular communications technology). In other embodiments, the fasteners 510 may fixedly secure the receiving elements 320 to a boot, as more fully discussed below with reference to FIG. 8.

With reference to FIG. 6, the reference numeral 600 depicts a rugged antenna assembly being used as one or both of the receiving elements 320. This rugged antenna assembly 600 includes two attachment points along its robustly designed body to the mobile device. Further, the rugged antenna assembly 600 is connected via the media-routing conduit 330 to the snap-on module 310. In operation, the snap-on module 310 is configured to convey data received from the rugged antenna assembly 600 and promotes pass-through charging when docked to a charger, as depicted by reference numeral 600. That is, one side of the snap-on module 310 is adapted to dock with the charger and to pass through the power distributed therefrom to a battery, while the other side of the snap-on module 310 is adapted to engage to the rearward end of the mobile device. In exemplary embodiments, engaging comprises the following steps: physically assembling the snap-on module 310 to the body of the mobile device; and automatically establishing an electronic interface between the snap-on module and the processing unit of the mobile device.

Turning to FIG. 7, an elevation view of the first mobile device 100 of FIG. 1 with the apparatus installed thereto is shown, in accordance with an embodiment of the present invention. As discussed above, the snap-on module 310 is engaged to a rearward end of the body 110 of the first mobile device 100, while the receiving elements 320 are engaged to a forward end of the body 110 of the first mobile device 100. As illustrated, the media-routing conduits 330 operably couple and connect the receiving elements 320 to the snap-on module 310, and may be assembled to the body 110 or a boot surrounding the body 110.

With reference to FIG. 8, an elevation view similar to FIG. 7, but with a boot 800 covering portions of the installed apparatus, is shown according to embodiments. In instances, the boot 800 may be fabricated from a resilient material that absorbs impact (e.g., plastic or other elastomeric material). As illustrated, the boot 800 may cover a substantial surface area of the body 110, expose one side of the snap-on module 310 for purposes of docking to a charger, and surround a majority of the receiving elements (not shown) for purposes of protection.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A modular device comprising:
   a mobile device that includes a body and a processing unit housed within the body for running at least one application, wherein the body includes a forward end and a rearward end, and wherein the rearward end includes an electronic interface that is operably coupled to the processing unit;
   a snap-on module that electronically and physically engages to the electronic interface at the rearward end of the mobile device, wherein engagement establishes a communication path between the snap-on module and the processing unit of the mobile device;
   one or more antennas or sensors that (i) are assembled externally to the body of the mobile device and (ii) are located proximate to the forward end of the mobile device; and
   one or more media routing conduits each comprising an end and positioned externally alongside the body of the mobile device, the one or more media routing conduits (i) interconnecting the one or more antennas or sensors, respectively, to the snap-on module and (ii) providing one or more communication pathways that facilitate the exchange of signals between the one or more antennas or sensors, respectively, to the snap-on module;
   wherein the snap-on module comprises connectors configured to frictionally engage, physically couple with, and electronically interface to the ends of the one or more media routing conduits.

2. The modular device of claim 1, wherein the electronic interface of the mobile device is designed to dock with a charger that distributes power to at least one battery internal to the mobile device.

3. The modular device of claim 1, wherein the mobile device represents a bar-code scanner with radio-frequency identification (RFID)-reading functionality provisioned within the processing unit.

4. The modular device of claim 1, wherein the mobile device represents at least one of a mobile handset, a personal digital assistant, or a cellular phone.

5. The modular device of claim 1, wherein the physical engagement between the snap-on module and the electronic interface represents a selective fastening between the rearward end of the mobile device and the snap-on module.

6. The modular device of claim 1, wherein the at least one media routing conduit is configured to carry signals from the one or more antennas or sensors to the snap-on module for distribution as an input to the at least one application running on the processing unit.

7. The modular device of claim 1, wherein the at least one media routing conduit includes at least one of coaxial cable, twisted wire, or optical cable.

8. The modular device of claim 1, wherein the snap-on module includes one or more connectors that are designed to frictionally engage with one or more ends, respectively, of the at least one media routing conduit.

9. The modular device of claim 1, further comprising fasteners for holding the at least one media routing conduit against the body of the mobile device.

10. The modular device of claim 1, further comprising fasteners for holding the one or more antennas or sensors against the body of the mobile device.

11. The modular device of claim 1, wherein the one or more sensors are configured for reading RFID tags.

12. The modular device of claim 1, wherein the one or more antennas are configured for receiving transmissions.

13. The modular device of claim 1, wherein, during use, the rearward end of the mobile device is directed toward an operator.

14. The modular device of claim 1, further comprising a boot, fabricated of resilient material, that covers a substantial portion of the body of the mobile device while allowing the electronic interface to be exposed for the purpose of docking to a charger.

15. A modular device comprising:
   a mobile device that includes a casing and a processor protected by the casing, wherein the casing includes a first end and a second end, and wherein the second end exposes an electronic interface that is operably coupled to the processor;
   at least one battery that resides internally within the casing of the mobile device, wherein the electronic interface of the mobile device is designed to dock with a charger that distributes power to the at least one battery;
   a module that physically and electrically engages to the electronic interface at the second end of the mobile device, wherein engagement establishes a communication path between the module and the processor;
   one or more receiving elements that are assembled externally to and are positioned toward the first end of the casing of the mobile device, wherein the one or more receiving elements comprises at least one of antennas or sensors; and
   one or more media routing conduits each comprising an end and positioned externally alongside the casing of the mobile device, the one or more media routing conduits interconnecting the one or more receiving elements, respectively, to the module, wherein the one or more media routing conduits are configured to carry signals from the one or more receiving elements assembled externally to the first end of the casing of the mobile device to the processor via the module engaged to the electronic interface at the second end of the mobile device;

wherein the module comprises connectors configured to frictionally engage, physically couple with, and electronically interface to the ends of the one or more media routing conduits.

16. The modular device of claim 15, wherein the module is configured to dock with the charger, thereby allowing for distribution of power from the module to the at least one battery through the electronic interface without disengaging the module from the mobile device.

17. The modular device of claim 15, wherein (i) the one or more sensors are configured for reading RFID tags and (ii) the mobile device represents a bar-code scanner with radio-frequency identification (RFID)-reading functionality provisioned within the processing unit.

18. The modular device of claim 15, wherein the mobile device represents at least one of a mobile handset, a personal digital assistant, or a cellular phone.

* * * * *